United States Patent Office 3,776,898
Patented Dec. 4, 1973

3,776,898
AZO DYESTUFFS CONTAINING AS THE TERMINAL COUPLING COMPONENT A PYRROLIDONOANILINE
Lester N. Stanley, Delmar, and Russell E. Farris, Jr., Elnora, N.Y., assignors to GAF Corporation, New York, N.Y.
No Drawing. Filed Apr. 23, 1970, Ser. No. 31,379
Int. Cl. C09b 29/08, 29/36, 31/14
U.S. Cl. 260—156
12 Claims

ABSTRACT OF THE DISCLOSURE

Dye of the formula:

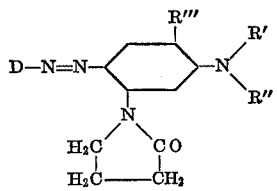

wherein D represents a diazotizable amine moiety free from carboxylic and sulfonic acid groups; R' and R" are selected from hydrogen, $C_{1-18}$ alkyl and substituted alkyl, aralkyl, and cycloalkyl; R''' is selected from hydrogen, lower alkyl and lower alkoxy, said dyes being suitable for dyeing hydrophobic fibers.

---

The present invention relates to a new class of dyes containing cyclic amide substituted couplers and more particularly, to such a novel class of dyes containing a pyrrolidone-substituted coupler particularly suitable for dyeing hydrophobic fibers.

It is well known that various hydrophobic fibers are quite difficultly dyed since such fibers do not normally retain the dyestuff to a sufficient degree to allow for a deep esthetic dyeing of the fiber or fabric.

While various additive materials have been proposed for both the fiber itself and for the conventional dyestuffs to promote adhesion and retention of the dye, such additive materials have not been sufficiently effective since there is a tendency to inhibit the advantageous properties of the fibers and dyes into which the additives are incorporated.

Until the present invention, therefore, it has not been possible to produce an extremely color-fast dye for hydrophobic fibers without the employment of these disadvantageous additives.

It has now been discovered, however, in accordance with the present invention, that certain dyes containing cyclic amide-substituted couplers, particularly, those containing pyrrolidone-substituted couplers have excellent properties for dyeing fibers and fabrics, particularly hydrophobic fibers.

It is, therefore, a principle object of the present invention to provide a novel class of dyes for the dyeing of fibers and fabrics, particularly hydrophobic fibers.

Yet a further object of the present invention is to provide certain novel dyes containing cyclic amide-substituted couplers, particularly those containing pyrrolidone-substituted couplers for the dyeing of hydrophobic fabrics.

Still further objects and advantages of the novel dyes of the present invention will become more apparent from the following more detailed description of the present invention.

The novel class of dyes of the present invention are represented by the formula:

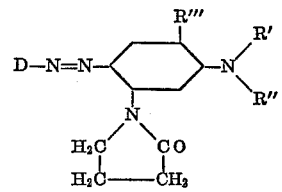

wherein R represents the moiety of a diazotizable amine which is free from carboxylic and sulfonic acid groups; R''' represents a radical selected from hydrogen, lower alkyl, e.g., methyl and ethyl, lower alkoxy, e.g., methoxy, ethoxy, propoxy and butoxy, hydroxy lower alkoxy and its acetylated product, e.g., acetoxy ethoxy; R' and R" represent radicals selected from hydrogen, $C_{1-18}$ alkyl; e.g., methyl, ethyl, propyl, isopropyl, butyl, octyl and octadecyl; aralkyl, e.g., benzyl, cycloalkyl, e.g., haloalkyl including chloroalkyl and substituted alkyl, e.g., chloroalkyl, bromoalkyl, cyanoalkyl, hydroxyalkyl; acyloxyalkyl, e.g., acetoxyalkyl, chloroacetoxyalkyl, cyanoacetoxyalkyl, propionyloxyalkyl, butyryloxyalkyl, benzoyloxyalkyl and substituted benzoyloxyalkyl, e.g., as by halo such as chloro and bromo, cyano; lower alkyl and lower alkoxy, carboxyalkyl, e.g., carboxymethyl, carboxypropyl, and their lower alkyl esters optionally substituted by halo including chloro and bromo, and cyano; amino alkyl, e.g., aminoethyl, alkylaminoalkyl such as; methylaminoethyl, and dimethylaminoethyl, diethylaminoethyl, dimethylaminopropyl; morpholinoethyl; and quaternary ammonium halide-substituted alkyl, e.g. triloweralkyl ammonium (halide) alkyl including trimethylammonium (halide) ethyl, triethylammonium (halide) ethyl, and trimethylammonium (halide) propyl, pyridinium (halide) ethyl, and 2-hydroxy-3-pyridinium (halide) propyl.

The diazo base of the dyes of the present invention includes a wide range of diazotizable amines which are free from sulfonic and carboxylic acid groups. Representative amines include, for example:

aniline
o-, m- and p-dichloroaniline
2,4- and 2,5-dichloroaniline
2,4- and 2,5-dibromoaniline
o-, m- and p-toluidine
the xylidines
o-, m- and p-anisidine
o-, m- and p-phenetidine
the cresidines
4- and 5-chloro-o-anisidine
4- and 5-chloro-o-toluidine
2,4-dinitroaniline
2,4-dinitro-6-chloroaniline
2,4-dinitro-6-bromoaniline
4-nitro-o-toluidine
2-nitro-p-anisidine
4-nitro-o-anisidine
4-nitro-2,6-dichloroaniline
4-nitro-2-chloroaniline
2-cyano-4-nitro-6-chloroaniline
4-cyano-2,5-dimethoxyaniline 4-nitro-2-cyanoaniline
4-nitro-2-bromoaniline
2-methylsulfonyl-4-nitroaniline
2,4-dinitro-6-[N-ethylsulfonamido]-aniline
5-carbamyl-o-anisidine
6-chloro-3-(trifluoromethyl)aniline
2-(dimethylsulfamyl)aniline
3-amino-4-toluenesulfonic acid dimethyl amide
4-(p-anisidino)aniline
4-benzoylamido-2,5-dimethoxyaniline
4-benzoylamido-2,5-diethoxyaniline
4-(4-nitrobenzoylamido)-2,5-dimethoxyaniline
1- and 2-naphthylamine
1-aminoanthraquinone
2-, 3- and 4-aminopyridine
2-aminofurane
2-aminothiophene
2-aminoquinoline
7-aminoquinoline
2-aminobenzothiazole
6-aminobenzothiazole
2-amino-5-nitrothiazole
2-amino-6-methoxy-benzothiazole
7-aminocoumarin
4-(m-tolylazo)-m-toluidine
4-(4-nitro-2,6-dichlorophenylazo)-4-methyl-m-anisidine
4-(4-nitrophenylazo)-2,5-dimethoxy aniline
benzidine
dianisidine Exemplary of the coupler moieties useful in connection with the instant invention are compounds wherein

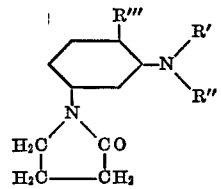

is exemplified as follows:

In general, the coupler intermediates of the present invention are prepared by reacting one mole of an m-phenylenediamine compound with approximately one mole of butyrolactone. This reaction is preferably carried out satisfactorily by autoclaving at temperatures of 175–300° C. and under pressures which may vary from about 175–400 p.s.i. The time may range from about 3–15 hours.

The desired monoproduct is separated from any bisproduct by solubilizing in acid and then alkylating in known manner to produce the desired N-substituted coupler.

In the case where R''' is not hydrogen, it has been found preferable to react a compound having the formula:

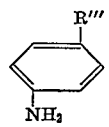

with an approximately equal amount of butyrolactone up to an excess of about 10% of butyrolactone, and then mono-nitrate, reduce and alkylate in known manner.

The coupler intermediate is then coupled in acid medium with the desired diazo compound to produce the dyes encompassed by the present invention.

The dyes of the present invention are excellent dyes for dyeing hydrophobic fibers such as polyester fibers, polyacrylonitrile fibers, nylon fibers, polypropylene fibers and the like. Additionally, acetate fibers are excellently dyed by the materials of the present invention.

The following examples illustrate the present invention, but are not to be considered as limitative thereto.

| Ex. | R' | R'' | R''' |
|---|---|---|---|
| 1 | H | H | H |
| 2 | CH₃ | H | H |
| 3 | CH₃ | CH₃ | H |
| 4 | CH₃ | CH₃ | CH₃ |
| 5 | C₂H₅ | C₂H₅ | OCH₃ |
| 6 | C₂H₅ | C₂H₅ | H |
| 7 | C₂H₅ | C₂H₅ | OC₂H₅ |
| 8 | CH₃ | CH₃ | OC₃H₇ |
| 9 | CH₃ | CH₃ | OC₄H₉ |
| 10 | C₂H₅ | C₂H₅ | OC₂H₄OH |
| 11 | C₂H₅ | C₂H₅ | OC₂H₄OCOCH₃ |
| 12 | C₈H₁₇ | H | H |
| 13 | C₆H₅CH₂ | H | H |
| 14 | C₆H₁₁ | H | H |
| 15 | C₂H₄Cl | C₂H₄Cl | OCH₃ |
| 16 | C₂H₄Br | C₂H₄Br | OCH₃ |
| 17 | C₂H₄CN | C₂H₄OCOCH₃ | OCH₃ |
| 18 | C₂H₄OH | C₂H₄OH | H |
| 19 | C₂H₄CN | C₂H₄OCOCH₂Cl | H |
| 20 | C₂H₄Cl | C₂H₄OCOCH₂CN | H |
| 21 | C₂H₄OCOCH₃ | C₂H₄OCOCH₃ | H |
| 22 | C₂H₄OCOC₂H₅ | C₂H₄OCOC₂H₅ | H |
| 23 | C₂H₄OCOC₃H₇ | C₂H₄OCOC₃H₇ | H |
| 24 | CH₂CH₂CN | C₂H₄OCOC₆H₅ | H |
| 25 | CH₂COOH | CH₂COOH | H |
| 26 | CH₂COOCH₃ | CH₂COOCH₃ | H |
| 27 | CH₂COOCH₂Cl | C₂H₅ | H |
| 28 | CH₂COOCH₂Br | C₂H₅ | H |
| 29 | CH₂COOCH₂CN | C₂H₅ | H |
| 30 | CH₂CHOHCH₂Cl | CH₂CHOHCH₂Cl | H |
| 31 | CH₂CH(OCOCH₃)CH₂Cl | CH₂CH(OCOCH₃)CH₂Cl | OC₂H₄OCOCH₃ |
| 32 | H | C₂H₄N(CH₃)₂ | H |
| 33 | H | C₂H₄N⁺(CH₃)₃Cl⁻ | H |
| 34 | C₂H₄N(CH₃)₂ | C₂H₄(CH₃)₂ | H |
| 35 | C₂H₄N⁺(CH₃)₃Cl⁻ | C₂H₄N⁺(CH₃)₃Cl⁻ | H |
| 36 | C₂H₄N⁺⟨C₅H₅⟩Cl⁻ | H | H |
| 37 | CH₂CHOHCH₂N⁺⟨C₅H₅⟩Cl⁻ | CH₂CHOHCH₂N⁺⟨C₅H₅⟩Cl⁻ | H |

EXAMPLE 1

Preparation of:

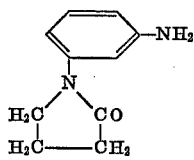

Some 1125 g. m-phenylenediamine and 798 ml. butyrolactone were charged into an autoclave and heated at 220° C. for 6 hours at a pressure ranging from 200–233 p.s.i. The system was allowed to cool and then drowned in about 6 l. water and 450 ml. concentrated hydrochloric acid. The fine precipitate of bis byproduct was filtered. The filtrate containing the mono substituted product was made slightly alkaline with sodium hydroxide. The yellow precipitate was suction filtered and dried at 80° C. to give a product having a M.P. 105° C. The yield was 48%.

EXAMPLE 2

Preparation of:

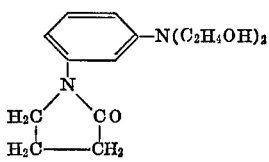

Then 35.2 g. of the above product of Example 1, were dissolved in 170 ml. water, and treated with 120 g. of ethylene chlorohydrin and 44 g. chalk at the reflux temperature for about 18 hours. The chalk was filtered and washed with 200 ml. water. One-half of the filtrate was adjusted to pH 5 with dilute hydrochloric acid to act as a coupler solution.

EXAMPLE 3

Preparation of:

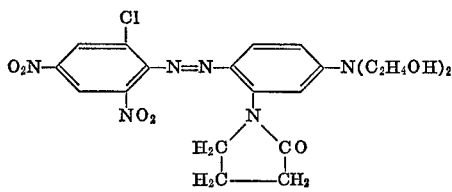

Then 21.7 g. 6-chloro-2,4-dinitroaniline were dissolved in 104 ml. sulfuric acid (66° Bé.). Some 78 g. of 9.1% nitrosyl sulfuric acid were added dropwise at room temperature. This diazo solution was then added dropwise to the coupler of solution of Example 2. It was stirred for 2 hours and the filtered dye re-sludged twice in 1500 ml. water, suction filtered and dried at 80° C. It was then recrystallized from isopropanol to produce a blue violet dyestuff.

EXAMPLE 4

Preparation of:

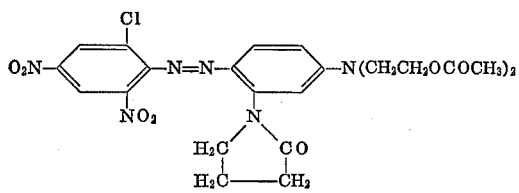

Some 10 g. of the dye of Example 3 were dissolved at room temperature in 50 ml. dioxane and treated with 15 ml. acetic anhydride and 1 ml. pyridine. It was refluxed for about 3 hours, cooled, then drowned in ice water. The acetylated dye was resludged twice in 1 l. of cold water, filtered and dried, producing a red violet dyestuff.

EXAMPLE 5

Preparation of:

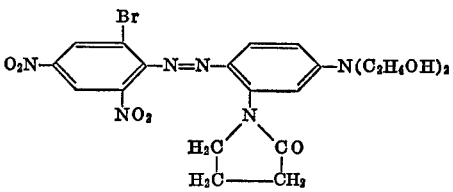

Some 26.2 g. 6-bromo-2,4-dinitroaniline were dissolved in 104 ml. sulfuric acid (66° Bé.). Then 80 g. of 8.9% nitrosyl sulfuric acid were added dropwise at room temperature and this was than added dropwise to ½ the coupler solution of Example 2 which has been diluted to 1:1 and cooled with ice. It was stirred in ice 2 hours, filtered, re-sludged twice in water, filtered, oven dried and recrystallized from isopropanol producing a bluish violet dye. A reddish violet dye was obtained upon acetylation of this product, as in Example 4.

EXAMPLE 6

Preparation of:

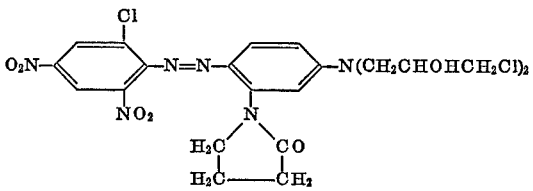

Some 17.6 g. of N-(3-aminophenyl)-2-pyrrolidone were dissolved in 400 ml. water and treated with 35 g. epichlorohydrin at 30–35° C. The resulting viscous material was dissolved by adding 30 ml. hydrochloric acid (20° Bé.) to form a coupler solution.

Then 21.7 g. 6-chloro-2,4-dinitroaniline were dissolved in 104 ml. sulfuric acid (66° Bé.) and treated dropwise with 80 g. 8.9% nitrosyl sulfuric acid at 25–30° C.

The above prepared coupler solution was diluted to 1:1. While stirring in ice, the diazo solution was added dropwise to this coupler solution and stirred 1½ hours in ice. The dyestuff was filtered, re-sludged in water until acid free, and dried at 80° C. The yield of violet dyestuff was 80%.

EXAMPLE 7

Preparation of:

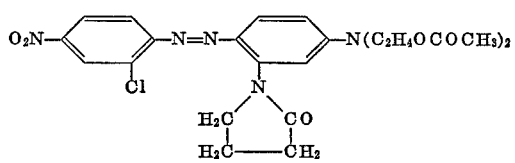

Some 17.3 g. 2-chloro-4-nitroaniline were slurried in 31 ml. hydrochloric acid (20° Bé.) and 100 ml. water. This was cooled to 5–10° C. in an ice bath. To this were added 19 ml. sodium nitrite solution (31.5%) and the system was stirred in ice for 1 hour and filtered to clarify.

N(-3-[di(2-hydroxyethyl)amino]phenyl) - 2 - pyrrolidone was produced as in Example 2. Approximately ½ of the filtrate was diluted to 1 l., made slightly acidic with 10% hydrochloric acid. Keeping the coupler solution in an ice bath, the diazo was added dropwise, sodium acetate being added simultaneously to maintain the pH constant. The system was then stirred at room temperature for 2 hours, filtered and washed with water until acid-free and dried. The yield of red dyestuff was 81%.

Then 25 g. of this dye were dissolved in 125 ml. dioxane to which were added 38 ml. acetic anhydride and 3 ml. pyridine. The system was refluxed for 2½ hours, drowned into 500 ml. cold water, filtered, re-sludged in water, filtered, washed acid-free and dried. The yield of reddish brown dyestuff was 84%.

EXAMPLE 8

Preparation of:

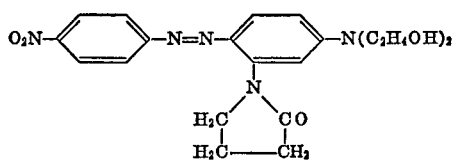

Some 13.8 g. p-nitroaniline were diazotized by slurrying in 31 ml. hydrochloric acid (20° Bé.) and 150 ml. water, and treating at 5–10° C. with 19 ml. sodium nitrite solution. This diazo was then added dropwise to a coupler solution prepared in the manner of Example 7. The dyestuff was filtered, washed with water until acid-free, and dried. The yield was approximately 46 gms. of red-orange dyestuff. Acetylation of this dye according to Example 4 yielded an orange dyestuff.

EXAMPLE 9

Preparation of:

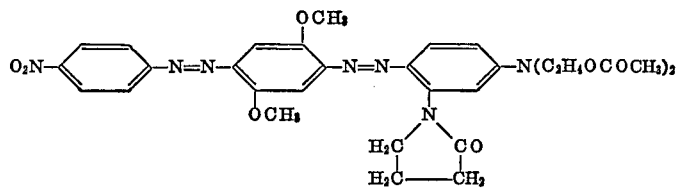

Some 0.1 mole of the dye produced by diazotizing and coupling p-nitroaniline with 2,5-dimethoxyaniline were slurried in acidified water to a volume of about 1400 ml. A 35 g. sodium nitrite solution (31.5%) diluted to 140 ml. was added dropwise below the surface of the solution of the diazo base at 43–45° C. It was then stirred ½ hour and added to a coupler solution as in Example 7. The dyestuff was filtered, washed with 3 l. hot water until neutral and dried. The yield was 72%.

Then 15 g. of this product were dissolved in 175 ml. dioxane to which was then added 23 ml. acetic anhydride and 2 ml. pyridine at 101° C. After refluxing 3 hours it was drowned in 300 ml. water. The dye precipitated was filtered and washed with water until acid-free. The yield of violet dyestuff was 82%.

EXAMPLE 10

Preparation of:

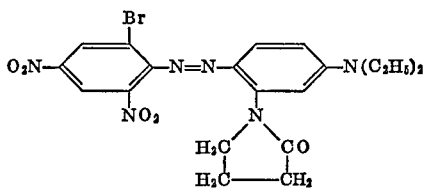

Some 35.2 g. N-(m-aminophenyl)-2-pyrrolidone were dissolved in 700 ml. water. At 60–65° C., 106 g. diethylsulfate were added dropwise while maintaining the pH at 7–8 by addition of soda ash. The system was maintained at a pH of 7–8 at 80–85° F. for 12 hours and on cooling formed a viscous oil. The yield was 70%.

Then 16.2 g. of this coupler were dissolved in 14 ml. hydrochloric acid 20° Bé. and diluted to 600 ml., then cooled in an ice bath.

Then 26.2 g. 6-bromo-2,4-dinitroaniline were dissolved in 104 ml. sulfuric acid 66° Bé., treated with 24 g. nitrosyl sulfuric acid (30.2%) at 25–30° and then added dropwise to the coupler solution, 100 g. sodium acetate in 200 ml. water being added simultaneously. It was stirred 2 hours in an ice bath. The dye was filtered, resludged in water, filtered and dried. The yield of violet dyestuff was 65%.

EXAMPLE 11

Preparation of:

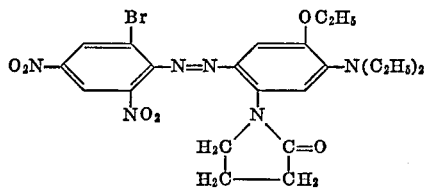

1289 g. p-phenetidine and 896 g. butyrolactone were charged in an autoclave and heated at 280° C. for 7 hours at a pressure of 360 p.s.i. It was allowed to cool and then drowned into 8 liters of ice-water containing 25 cc. concentrated hydrochloric acid to precipitate the product. The product was filtered, washed with a slightly alkaline solution and dried. Weight 1796 g. of M.P. 113–114° C.

Then 200 g. N-(p-ethoxyphenyl)-2-pyrrolidone were slowly added at —5° C. to a mixture of 642 ml. sulfuric acid (66° Bé.) and 36 ml. sulfuric acid (100%). A mixed acid consisting of 132 g. of 49% HNO₃-46% H₂SO₄ and 63 g. sulfuric acid (66° Bé.) was added slowly while still maintaining the temperature below —5° C. After all the mixed acid solution was added, the system was drowned very slowly into 1500 g. ice, filtered and washed with ice water until neutral, then dried. The yield was 77%, and on recrystallizing from isopropanol had a M.P. of 106° C.

To 620 ml. water were added 100 g. iron filings, 60 mesh, and 15 ml. hydrochloric acid (20° Bé.). This was heated to 85° C. and 140 g. of the N-(4-ethoxy-3-nitrophenyl)-2-pyrrolidone were added slowly. The temperature was maintained at 85° for one hour and then brought to a pH of 8–8.5 with soda ash (alkaline to Brilliant Yellow). The solution was filtered to remove the iron filings and cake washed with 1 l. boiling water. To this filtrate were added 288 g. diethyl sulfate and 70 g. soda ash in 200 ml. water. Additional soda ash was added as needed to maintain a pH of 7–8. The system was stirred overnight, the temperature dropping to room temperature. The resulting product was completely dissolved by adding 38 ml. hydrochloric acid (20° Bé.). Then 26.2 g. 6-bromo-2,4-dinitroaniline were diazotized with nitrosyl sulfuric acid and added to the coupler solution during 2 hours in an ice bath, keeping the pH at 4–5 with simultaneous addition of sodium acetate. It was stirred at room temperature for 3 hours. The tarry material was dissolved in acetone and precipitated by addition of water to produce a blue-violet dye.

EXAMPLE 12

Some 687 g. of the dye of Example 11 were dispersed by stirring with 171 g. Marasperse CB (a partially desulfonated sodium lignosulfonate, American Can Co.), 231 g. Maracarb N (salts of low molecular weight lignosulfonate, American Can Co.), 90 g. Sorbo (70% d-sorbitol solution) and 24 g. Preventol GDC (chlorinated methylene bisphenol, GAF Corporation), and then ball-milled for 23 hours. An excellent dispersion was obtained.

Five ounces of the dye were dissolved in 1 gallon of water and then thickened to a padding consistency with 0.2 ounce of Keltex gum (gum tragacanth) and 0.1 ounce of Leonil SA (anionic naphthalenesulfonate dispersing agent). A 5½ x 18 inch piece of Dacron polyester fiber (poly-condensate of terephthalic acid with ethylene glycol) was padded with the above dye at 160° F., dried, and then subjected to 425° F. for 1½ minutes. The material was soaped for 5 minutes at the boil, rinsed and dried. A violet dyeing was obtained, which had excellent sublimation fastness when used in the Thermosol process.

This same dispersed dyestuff also dyed nylon a deep violet shade.

EXAMPLE 13

The dispersed dye of Example 4 dyed nylon a deep scarlet and polypropylene a light scarlet.

EXAMPLE 14

The dispersed dye of Example 9 also dyed nylon a very deep shade of blue-violet.

The dispersed dye of Example 10 also dyed nylon a very deep violet hue and polypropylene a light violet-blue.

EXAMPLE 15

The dispersed dyestuff of the formula:

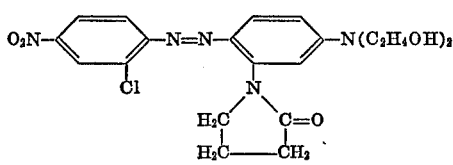

prepared according to the initial steps in Example 7, dyed nylon a deep red shade and polypropylene a light red shade.

EXAMPLE 16

Preparation of:

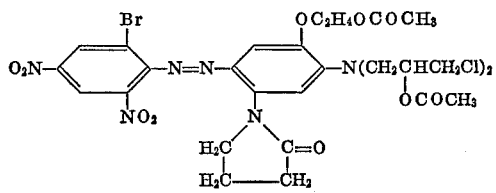

This dye was prepared by reacting butyrolactone with p-(2-hydroxyethoxy)aniline, mononitrating when cold, reducing, reacting with epichlorohydrin, coupling with diazotized 2,4-dinitro-6-bromoaniline and acetylating. The dye was a red-violet dye.

EXAMPLE 17

Preparation of:

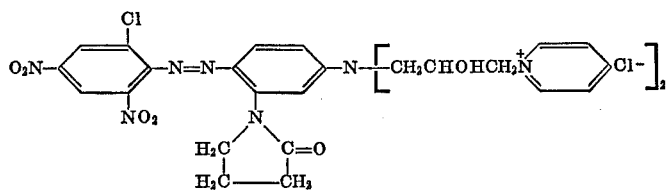

Some 10 gms. of the dye of Example 6 were dissolved in 50 gms. pyridine and refluxed 18 hours. On cooling to 55° C. a viscous, sticky material was obtained. Excess pyridine was decanted, the remainder evaporated to dryness in 80° C. oven. The semicrystalline solid obtained was dissolved in water, again taken to dryness in an oven. This water-soluble cationic dye gave reddish-violet shades on Orlon and Acrilan.

While certain preferred embodiments of the present invention have been illustrated by way of specific example, it is to be understood that the present invention is in no way to be deemed as limited thereto but should be construed as broadly as all or any equivalents thereof.

What is claimed is:
1. A dye having the formula:

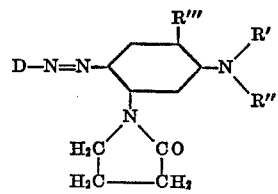

wherein D represents a radical selected from the group consisting of phenyl, phenyl substituted by halo, lower alkyl, lower alkoxy, nitro, cyano, lower alkylsulfonyl, lower alkylsulfamyl, carbamyl, trifluoromethyl, phenyl, benzoylamido, or phenylazo, naphthyl, anthraquinonyl, pyridyl, furyl, thiopheninyl, quinolyl, benzothiazolyl, thiazolyl and coumarinyl; R''' represents a radical selected from the group consisting of hydrogen, lower alkyl, lower alkoxy, hydroxy lower alkoxy and acetoxy lower alkoxy; R' and R'' represent radicals selected from the class consisting of hydrogen, benzyl, cyclohexyl, $C_{1-18}$ alkyl, and $C_{1-18}$ alkyl substituted by a member of the group consisting of halo, cyano, hydroxy, lower alkanoyloxy, lower alkanoyloxy substituted by halo or cyano, benzoyl, benzoyl substituted by halo, cyano, lower alkyl or lower alkoxy, carboxy of its lower alkyl, lower haloalkyl or lower cyanoalkyl esters, amino, lower alkylamino, morpholino, triloweralkyl ammonium halide, and pyridinium halide.

2. The dye of claim 1 wherein said dye corresponds to the formula:

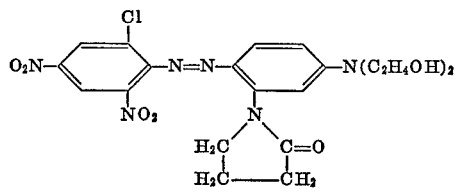

3. The dye of claim 1 wherein said dye corresponds to the formula:

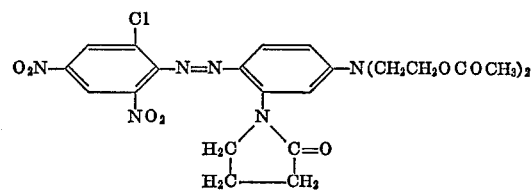

4. The dye of claim 1 wherein said dye corresponds to the formula:

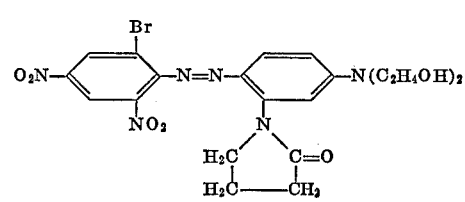

5. The dye of claim 1 wherein said dye corresponds to the formula:

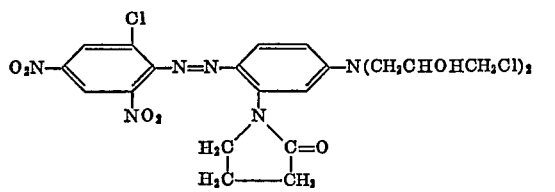

6. The dye of claim 1 wherein said dye corresponds to the formula:

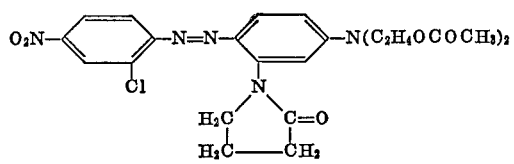

7. The dye of claim 1 wherein said dye corresponds to the formula:

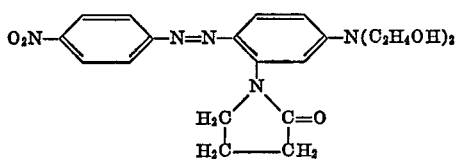

8. The dye of claim 1 wherein said dye corresponds to the formula:

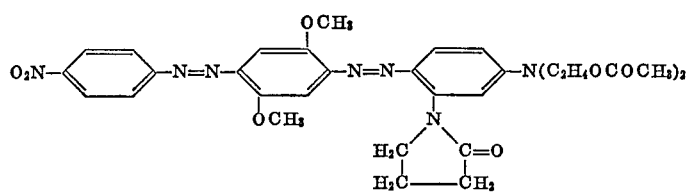

9. The dye of claim 1 wherein said dye corresponds to the formula:

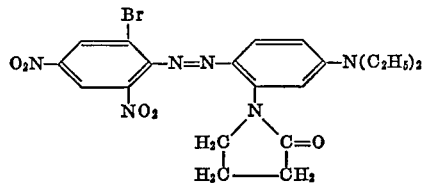

10. The dye of claim 1 wherein said dye corresponds to the formula:

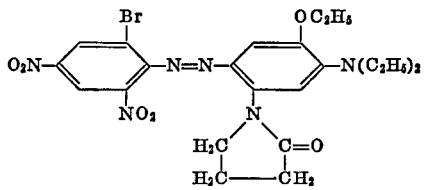

11. The dye of claim 1 wherein said dye corresponds to the formula:

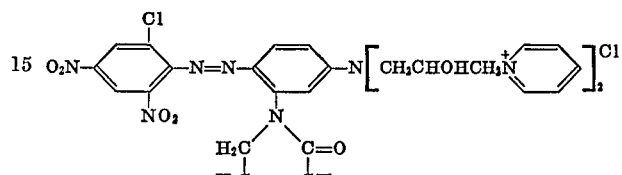

12. The dye of claim 1 wherein said dye corresponds to the formula:

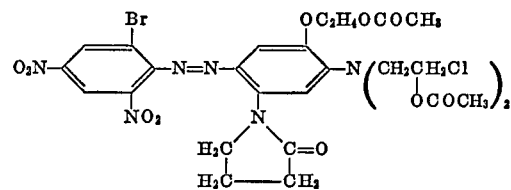

References Cited
UNITED STATES PATENTS
2,804,455  8/1957  Dorlars et al. _____ 260—152
3,424,741  1/1969  Wallace et al. _____ 260—158

FLOYD DALE HIGEL, Primary Examiner

U.S. Cl. X.R.

8—41 B, 41 C, 41 D; 260—152, 155, 158, 206, 326.5 FL